US008886708B2

(12) United States Patent
Antony

(10) Patent No.: US 8,886,708 B2
(45) Date of Patent: Nov. 11, 2014

(54) CENTRALIZED COMPUTER NETWORK VIRTUALIZATION ENVIRONMENT

(75) Inventor: Jinto Antony, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 675 days.

(21) Appl. No.: 12/629,132

(22) Filed: Dec. 2, 2009

(65) Prior Publication Data

US 2011/0131573 A1 Jun. 2, 2011

(51) Int. Cl.
*G06F 15/16* (2006.01)
*G06F 3/038* (2013.01)
*G06F 3/023* (2006.01)
*G06F 9/455* (2006.01)

(52) U.S. Cl.
CPC ............ *G06F 9/45533* (2013.01); *G06F 3/038* (2013.01); *G06F 3/023* (2013.01)
USPC .......................................... 709/203; 709/238

(58) Field of Classification Search
None
See application file for complete search history.

(56) References Cited

U.S. PATENT DOCUMENTS

2003/0061392 A1* 3/2003 Chang et al. .................. 709/250
2008/0005414 A1* 1/2008 Liu et al. ......................... 710/62
2008/0168118 A1* 7/2008 Hickey et al. ................. 709/201
2008/0201479 A1* 8/2008 Husain et al. ................. 709/227
2008/0301340 A1* 12/2008 Stotz .............................. 710/68

* cited by examiner

*Primary Examiner* — Scott Christensen

(57) ABSTRACT

A method and system include compatibly interfacing a suitably adapted central switch in a computer network virtualization environment to one or more user-end peripheral device(s) to dispense with a need for a user-end thin client. The method and system also include appropriately routing a data associated with a direct and exclusive communication between a virtual machine on a host server including a number of virtual machines and the one or more user-end peripheral device(s) using the central switch.

17 Claims, 7 Drawing Sheets

START
402
TRANSMIT PACKET DATA ASSOCIATED WITH ALL VMs FROM HOST SERVER TO CENTRAL SWITCH
404
SEPARATE PACKET DATA FROM VM INTENDED FOR PERIPHERAL DEVICE AT CENTRAL SWITCH
406
COMBINE PACKET DATA ASSOCIATED WITH VM AND PERIPHERAL DEVICE AT THE CENTRAL SWITCH
408
PROCESS COMBINED PACKET DATA AT THE CENTRAL SWITCH TO GENERATE PERIPHERAL SIGNAL
410
CONVERT PERIPHERAL SIGNAL TO A FORMAT COMPATIBLE WITH PERIPHERAL DEVICE USING THE USER-END CONVERTER
END

CENTRALIZED COMPUTER NETWORK VIRTUALIZATION ENVIRONMENT

BACKGROUND

A computer network virtualization environment (e.g., Virtual Desktop Infrastructure (VDI)) may utilize thin clients at the user-end to access virtual desktops associated with users. The virtual desktops may be displayed in virtual machines (VMs) that the users may communicate with through the thin clients. The virtual machines may reside on a host server to which a network switch may be coupled to.

Thin clients may be low-end desktop computers, which may merely be used to connect to the remote desktops through a remote desktop connection (e.g., Microsoft®'s Remote Desktop Protocol (RDP) connection) or a web interface. FIG. 1 shows a thin client based computer network virtualization environment 100. The computer network virtualization environment 100 may include a host server 102 on which a number of VMs $\mathbf{104}_1 \ldots \mathbf{104}_N$ reside. The VMs $\mathbf{104}_1 \ldots \mathbf{104}_N$ may be mapped to respective thin clients $\mathbf{110}_1 \ldots \mathbf{110}_N$ through a connection manager 106. The connection manager 106 may be software-based.

The thin clients $\mathbf{110}_1 \ldots \mathbf{110}_N$ may connect to the remote desktops through the computer network 108 (e.g., Internet, Local Area Network (LAN), Wide Area Network (WAN)). A remote desktop connection may be required for the purpose, as discussed above. There may be some latency associated with connecting to the remote desktops. Patch management may also be required at the thin client end as the thin clients $\mathbf{110}_1 \ldots \mathbf{110}_N$ may include operating systems.

SUMMARY

Disclosed are a method, an apparatus, and a system to realize a centralized computer network virtualization environment using a central switch.

In one aspect, a method includes compatibly interfacing a central switch in a computer network virtualization environment to one or more user-end peripheral device(s) to dispense with a need for a user-end thin client. The method also includes appropriately routing a data associated with a direct and exclusive communication between a virtual machine on a host server including a number of virtual machines and the one or more user-end peripheral device(s) using the central switch.

In another aspect, a method includes directly communicating exclusively between a virtual machine on a host server including a number of virtual machines and one or more user-end peripheral device(s) in a computer network virtualization environment through a central switch configured to appropriately route a data associated with the exclusive communication between the virtual machine on the host server and the one or more user-end peripheral device(s).

The method also includes converting the data associated with the exclusive communication between the virtual machine and the one or more user-end peripheral device(s) to an appropriate format recognizable by the one or more user-end peripheral device(s) and the host server using the central switch and/or a user-end converter during the routing of the data associated with the exclusive communication between the virtual machine and the one or more user-end peripheral device(s).

In yet another aspect, a central switch includes a host server interface configured to compatibly interface the central switch to a host server in a computer network virtualization environment. The host server includes a plurality of virtual machines, each of which is associated with one or more user-end peripheral device(s). The central switch also includes a converter interface configured to compatibly interface the central switch to a user-end converter associated with the one or more user-end peripheral device(s).

A data associated with a direct and exclusive communication between a virtual machine on the host server and the associated one or more user-end peripheral device(s) is configured to be appropriately routed to the host server or the associated one or more user-end peripheral device(s) through the host server interface and the converter interface.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

DETAILED DESCRIPTION

Example embodiments, as described below, may be used to realize a centralized computer network virtualization environment through a central switch. Although the present embodiments have been described with reference to specific example embodiments, it will be evident that various modifications and changes may be made to these embodiments without departing from the broader spirit and scope of the various embodiments.

Figure 1:
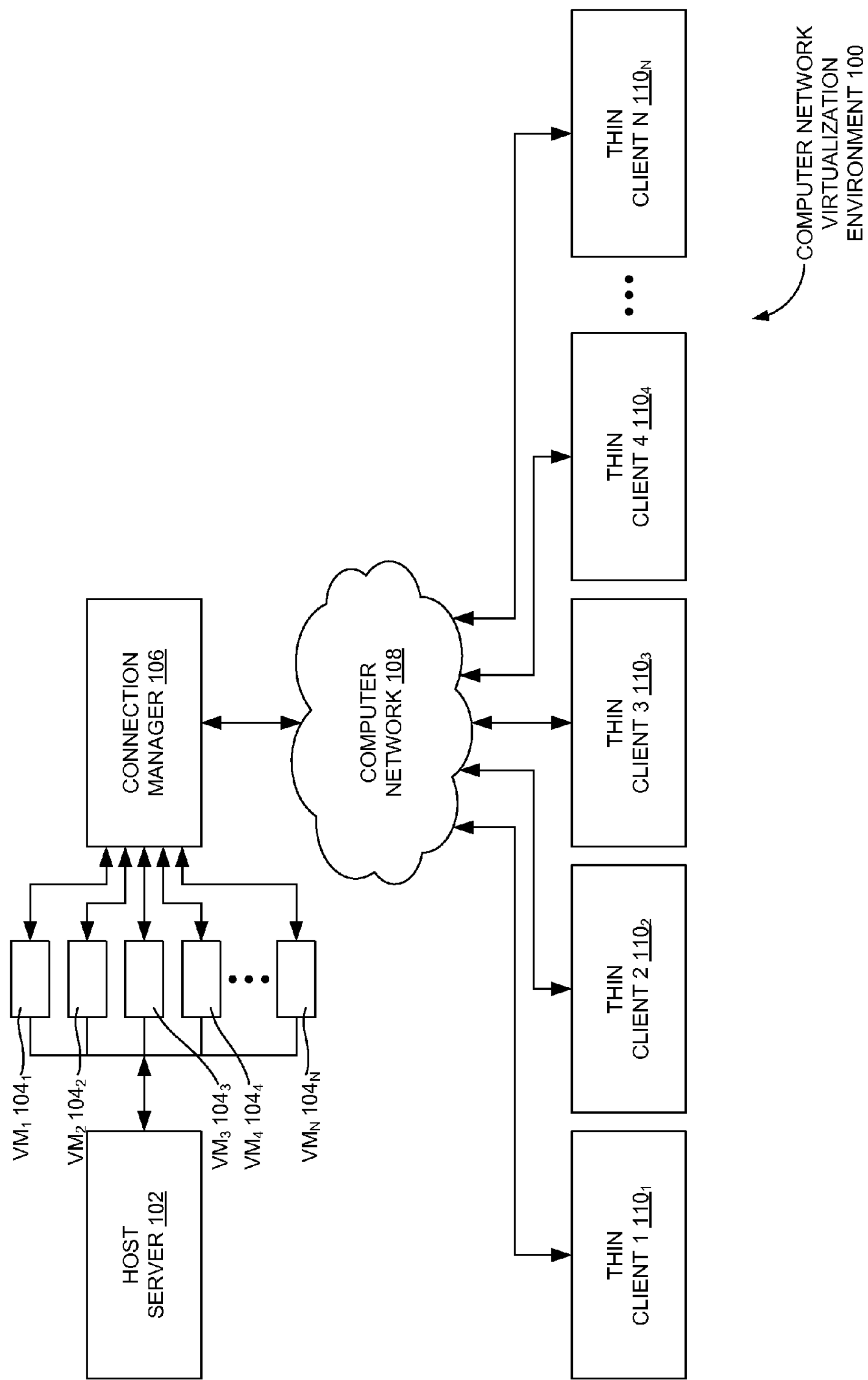
FIG. 1 is a system view of a thin client based computer network virtualization environment, according to one or more embodiments.
Figure 2:
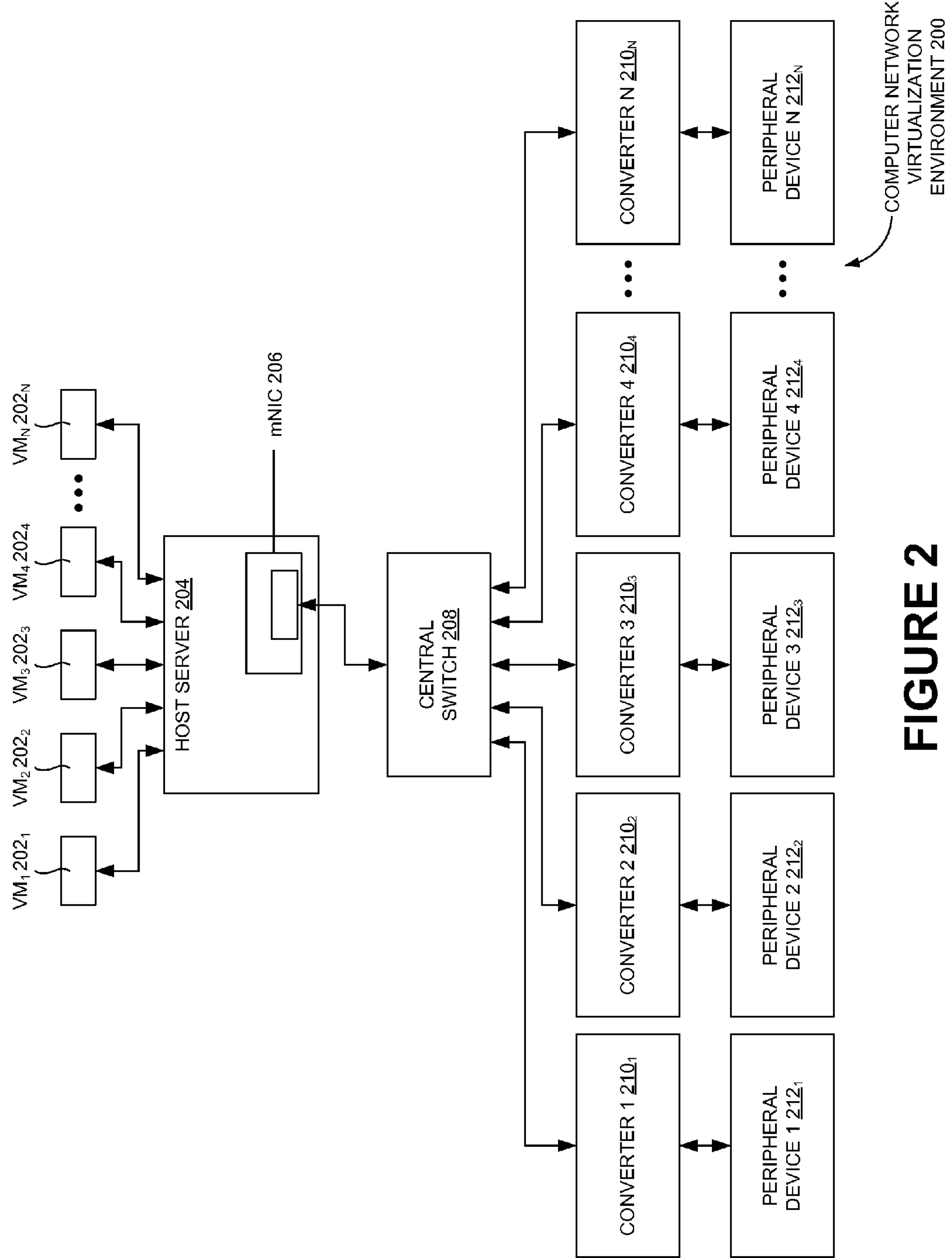
FIG. 2 is system view of a computer network virtualization environment, according to one or more embodiments.

FIG. 2 shows a computer network virtualization environment 200, according to one or more embodiments. In one or more embodiments, the computer network virtualization environment 200 may include a host server 204 configured to host a number of VMs ($\mathbf{202}_1 \ldots \mathbf{202}_N$). In one or more embodiments, VMs $\mathbf{202}_1 \ldots \mathbf{202}_N$ may be virtualized desktops associated with end users who may communicate exclusively with VMs $\mathbf{202}_1 \ldots \mathbf{202}_N$ directly through the corresponding peripheral devices $\mathbf{212}_1 \ldots \mathbf{212}_N$. For example, there may be a direct and exclusive communication between peripheral device $\mathbf{212}_1$ and VM $\mathbf{202}_1$, peripheral device $\mathbf{212}_2$ and VM $\mathbf{202}_2$, peripheral device $\mathbf{212}_3$ and VM $\mathbf{202}_3$, peripheral device $212_N$ and VM $202_N$ etc. In one or more embodiments, peripheral device $212_1 \ldots 212_N$ may each be a physical Keyboard, Video, Mouse (KVM), i.e., a physical keyboard, a physical video display unit (or computer monitor), and a physical mouse or any combination of a physical keyboard, a computer monitor, a physical mouse and any other IO unit/USB port that may be used by end user.

In one or more embodiments, communication between peripheral device $212_1 \ldots 212_N$ and a corresponding VM $202_1 \ldots 202_N$ may be accomplished through a central switch 208. In one or more embodiments, the central switch 208 may couple to a management network interface card (mNIC 206) of the host server 204. In one or more embodiments, mNIC 206 may be configured to assign an identification information (e.g., Media Access Control (MAC) address) to each of the VMs $202_1 \ldots 202_N$ on the host server 204. In one or more embodiments, the central switch 208 may not only perform the functions associated with a normal network switch but also may segregate packet data (e.g., display Internet Protocol (IP) packets) associated with each VM $202_1 \ldots 202_N$ and transmit the packet data to interfaces (e.g., ports) available on the central switch 208 that are configured to couple to converters $210_1 \ldots 210_N$ interfaced with the peripheral devices $212_1 \ldots 212_N$.

In one or more embodiments, converters $210_1 \ldots 210_N$ may each convert a peripheral signal generated from the packet data segregated by the central switch 208 to a format that may be recognizable by the peripheral devices $212_1 \ldots 212_N$. In one or more embodiments, the converters $210_1 \ldots 210_N$ may be a PS/2+video to CAT5 dongle, a PS/2+video CAT6 dongle, a Universal Serial Bus (USB)+video dongle, PS/2 dongle and/or a PS/2/USB+video cable to convenience compatibility with a number of peripheral devices $212_1 \ldots 212_N$ such as keyboards, computer monitors, mouse and other user end devices. In one or more embodiments, the central switch 208 may couple to the converters $210_1 \ldots 210_N$ through a Registered Jack (RJ) 45 interface. In one or more embodiments, the central switch 208 may also couple to the host server 204 through an RJ45 interface. In one or more embodiments, wireless coupling between the central switch 208, the host server 204 and/or the converters $210_1 \ldots 210_N$ may also be employed.

Figure 3:
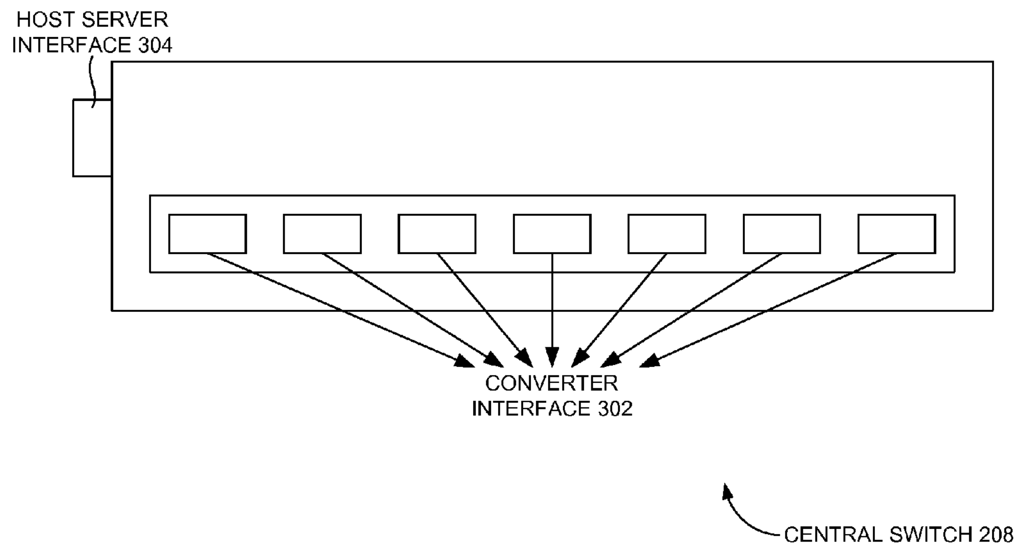
FIG. 3 is a schematic view of a central switch, according to one or more embodiments.

FIG. 3 shows a central switch 208, according to one or more embodiments. In one or more embodiments, the central switch 208 may include a converter interface 302 (e.g., RJ45 port) configured to be utilized in the coupling of the central switch 208 to the converters $210_1 \ldots 210_N$. In one or more embodiments, the converters $210_1 \ldots 210_N$ associated with individual peripheral devices $212_1 \ldots 212_N$ may be coupled to a corresponding converter interface 302 on the central switch 208. In one or more embodiments, the central switch 208 may also include a host server interface 304 (e.g., RJ45 interface) configured to couple to the host server 204. In one or more embodiments, one end of the central switch 208 may be configured to receive/transmit packet data (e.g., display IP packets) from/to the host server 204 and the other end may be configured to transmit/receive peripheral signals to/from the converters $210_1 \ldots 210_N$, as will be discussed below. In one or more embodiments, the peripheral signals may be compatible with the user-end converters $210_1 \ldots 210_N$, which may then convert the peripheral signals to a format compatible with the peripheral devices $212_1 \ldots 212_N$. For example, a PS/2 CAT5 dongle may convert peripheral signals to a format suitable to CAT5 cables.

In one or more embodiments, the central switch 208 may route a data associated with the direct and exclusive communication between a VM $202_1 \ldots 202_N$ and the host server 204. In one or more embodiments, the direct and exclusive communication between the VM $202_1 \ldots 202_N$ and the host server 204 may include transmitting the data from the host server 204 including the VM $202_1 \ldots 202_N$ to the corresponding peripheral device $212_1 \ldots 212_N$ and/or transmitting the data from the peripheral device $212_1 \ldots 212_N$ to the host server 204 including the VM $202_1 \ldots 202_N$.

Figure 4:
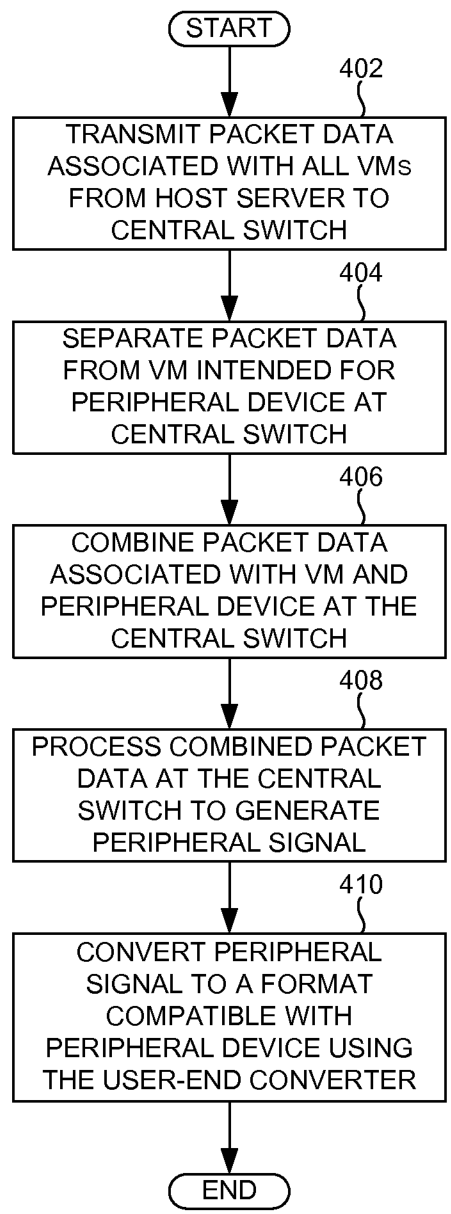
FIG. 4 is a flowchart detailing the operations involved in transmitting data from a host server including a virtual machine to a corresponding peripheral device, according to one or more embodiments.

FIG. 4 shows a flowchart detailing the operations involved in transmitting data from the host server 204 including the VM $202_1 \ldots 202_N$ to the corresponding peripheral device $212_1 \ldots 212_N$, according to one or more embodiments. In one or more embodiments, operation 402 may involve transmitting packet data associated with all VMs $202_1 \ldots 202_N$ from the host server 204 to the central switch 208. In one or more embodiments, the packet data may be, for example, Transmission Control Protocol/Internet Protocol (TCP/IP) packets. In one or more embodiments, operation 404 may involve separating the packet data from the VM $202_1 \ldots 202_N$ intended for the peripheral device $212_1 \ldots 212_N$ at the central switch 208 based on an identification data associated with the VM $202_1 \ldots 202_N$. In one or more embodiments, for example, a TCP port number may be utilized as the identification data associated with the VM $202_1 \ldots 202_N$. Therefore, the TCP/IP packets may be separated at the central switch 208 based on the TCP port number (compatible through the host server interface 304) associated with the VM $202_1 \ldots 202_N$.

In one or more embodiments, operation 406 may include combining the packet data associated with the communication between the VM $202_1 \ldots 202_N$ and the corresponding peripheral device $212_1 \ldots 212_N$ at the central switch 208. Therefore, the separated packet data associated with each VM $202_1 \ldots 202_N$ may be combined at the central switch 208. In one or more embodiments, operation 408 may include processing the combined packet data at the central switch 208 to generate a peripheral signal configured to be input to the appropriate converter $210_1 \ldots 210_N$. In one or more embodiments, the peripheral signal may be input to the appropriate converter $210_1 \ldots 210_N$ through the appropriate converter interface 302 (e.g., RJ45 interface). In one or more embodiments, the peripheral signal associated with the exclusive communication between the VM $202_1 \ldots 202_N$ and the corresponding peripheral device $212_1 \ldots 212_N$ may need to be converted to an appropriate format that is recognizable by the peripheral device $212_1 \ldots 212_N$.

Therefore, in one or more embodiments, operation 410 may involve converting the peripheral signal to a format compatible with the peripheral device $212_1 \ldots 212_N$ using the corresponding converter $210_1 \ldots 210_N$. In one or more embodiments, when an appropriate converter $210_1 \ldots 210_N$ is coupled to the converter interface 302, the peripheral signal may be converted to a format recognizable by the peripheral device $212_1 \ldots 212_N$ (e.g., keyboard, video, mouse).

Figure 5:
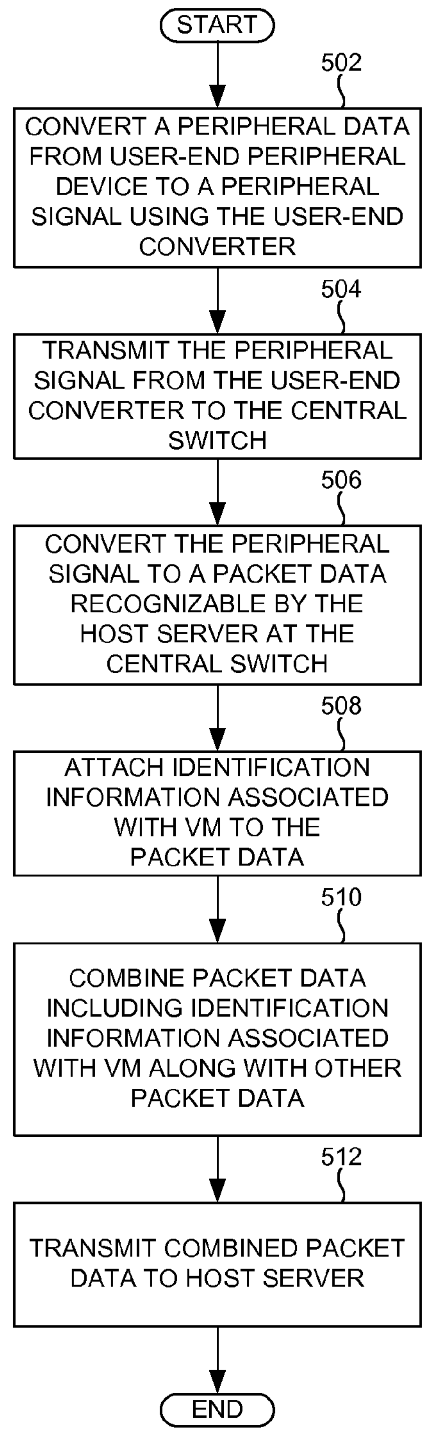
FIG. 5 is a flowchart detailing the operations involved in transmitting data from the peripheral device to the host server including the corresponding virtual machine, according to one or more embodiments.

FIG. 5 shows a flowchart detailing the operations involved in transmitting data from the peripheral device $212_1 \ldots 212_N$ to the host server 204 including the corresponding VM $202_1 \ldots$ VM $202_N$, according to one or more embodiments. In one or more embodiments, operation 502 may involve converting a peripheral data from the peripheral device $212_1 \ldots 212_N$ to a peripheral signal configured to be compatible with the converter interface 302 (e.g., RJ45 interface) of the central switch 208 using the appropriate converter $210_1 \ldots 210_N$. In one or more embodiments, operation 504 may involve transmitting the peripheral signal from the converter $210_1 \ldots 210_N$ to the central switch 208, i.e., through the converter interface 302 (e.g., RJ45 interface).

In one or more embodiments, operation 506 may involve converting the peripheral signal to a packet data (e.g., TCP/IP packets) recognizable by the host server 204 including the corresponding VM $\mathbf{202}_1 \ldots \mathbf{202}_N$ at the central switch 208. In one or more embodiments, operation 508 may involve attaching an identification information associated with the appropriate VM $\mathbf{202}_1 \ldots \mathbf{202}_N$ to the packet data recognizable by the host server 204 at the central switch 208. In one or more embodiments, the identification information may include, for example, a TCP/IP port number that is VM ($\mathbf{202}_1 \ldots \mathbf{202}_N$) specific.

In one or more embodiments, operation 510 may involve combining, at the central switch 208, the packet data including the identification information associated with the appropriate VM $\mathbf{202}_1 \ldots \mathbf{202}_N$ along with other packet data including corresponding VM ($\mathbf{202}_1 \ldots \mathbf{202}_N$) specific identification information thereof. In one or more embodiments, operation 512 may then involve transmitting the combined packet data to the host server 204 including the number of VMs $\mathbf{202}_1 \ldots \mathbf{202}_N$.

Therefore, in one or more embodiments, the abovementioned direct communication between a VM $\mathbf{202}_1 \ldots \mathbf{202}_N$, which may be a virtualized desktop associated with a user, and a corresponding peripheral device $\mathbf{212}_1 \ldots \mathbf{212}_N$ configured to be operated by the user may allow for dispensing with the need for a thin client at the user-end in a computer network virtualization environment 200. In one or more embodiments, the utilization of the central switch 208 may facilitate the users to access the virtualized desktops (VMs $\mathbf{202}_1 \ldots \mathbf{202}_N$) without any non-peripheral device hardware at the user-end. In one or more embodiments, converters $\mathbf{210}_1 \ldots \mathbf{210}_N$ may suffice at the user-end.

In one or more embodiments, the user-end requirement of booting the thin clients and connecting to the remote desktops using, for example, Microsoft®'s Remote Desktop Protocol (RDP) connection or a web interface may be dispensed with. In one or more embodiments, the central switch 208 may be utilized to seamlessly switch between VMs $\mathbf{202}_1 \ldots \mathbf{202}_N$ and the corresponding peripheral devices $\mathbf{212}_1 \ldots \mathbf{212}_N$.

Assuming a thin client based solution in a computer network virtualization environment where there are 24 users and 1 host server, 24 thin clients, along with 1 network switch, may be required. In one or more embodiments, assuming the same number of users in the computer network virtualization environment 200 shown in FIG. 2, the computer network virtualization environment 200 may merely require 24 user-end converters $\mathbf{210}_1 \ldots \mathbf{210}_N$ (e.g., PS/2 CAT5 dongles), along with the central switch 208. In one or more embodiments, the user-end converters $\mathbf{210}_1 \ldots \mathbf{210}_N$ may be more portable compared to the traditional thin clients. Additionally, in one or more embodiments, the lack of thin clients in the computer network virtualization environment 200 may provide for savings associated with hardware costs.

In one or more embodiments, the central switch 208 may be utilized, for example, in conjunction with TCP/IP switches in a computer network, depending on requirements thereof. In one or more embodiments, the lack of the need to connect to the remote desktop using, for example, Microsoft®'s RDP connection may provide for a real-time performance. In one or more embodiments, the end-user's experience may be similar to a native experience, i.e., the experience of directly working with a physical version of the remote desktop at the user-end.

In one or more embodiments, latency associated with connecting to the remote desktop using, for example, Microsoft®'s RDP connection in the case of a thin client based solution may be a non-issue in the computer network virtualization environment 200 of FIG. 2. In one or more embodiments, an end-user need to do patch management in a thin client based solution may also be a non-issue in the computer network virtualization environment 200 of FIG. 2. In one or more embodiments, the only user-end task required in the computer network virtualization environment 200 of FIG. 2 may be a conversion of a peripheral signal to a format recognizable by the peripheral devices $\mathbf{212}_1 \ldots \mathbf{212}_N$, as described above.

In one or more embodiments, the central switch 208 may be compatible with existing network (e.g., Local Area Network (LAN)) infrastructure. In one or more embodiments, this may be because the central switch 208 may employ a standard converter interface 302 (e.g., RJ45 interface) and a host server interface 304 (e.g., RJ45 interface).

In one or more embodiments, the user-end processing required in traditional thin client based solutions may be shifted to the central switch 208 in the computer network virtualization environment 200 of FIG. 2. In one or more embodiments, up until the host server interface 304 of the central switch 208, data associated with the communication between the VMs $\mathbf{202}_1 \ldots \mathbf{202}_N$ and the peripheral devices $\mathbf{212}_1 \ldots \mathbf{212}_N$ may be in the form of standard TCP/IP packets, as discussed above. Therefore, in one or more embodiments, standard switching using the central switch 208 may suffice to manage the TCP/IP packets.

In one or more embodiments, the central switch 208 may separate packets from each VM $\mathbf{202}_1 \ldots \mathbf{202}_N$ based on the peripheral device $\mathbf{212}_1 \ldots \mathbf{212}_N$ (e.g., video packet, mouse packet, keyboard packet etc.). As described above, in one or more embodiments, packet data may have an associated port number in the TCP/IP stack. In one or more embodiments, packet data specific to VMs $\mathbf{202}_1 \ldots \mathbf{202}_N$ may be segregated using the port number as the identification data. In one or more embodiments, therefore, the central switch 208 may perform additional functions as compared to standard network switches. Thus, in one or more embodiments, the central switch may be a KVM switch suitably adapted to the computer network virtualization environment 200 of FIG. 2.

In one or more embodiments, the additional functionality associated with the central switch 208 may pave the way for a centralized approach to desktop virtualization as the need for user-end hardware may be completely dispensed with. In one or more embodiments, the user-end maintenance requirements may be minimal in the computer network virtualization environment 200 of FIG. 2.

In one or more embodiments, the central switch 208 implementation may provide for improved security in the computer network virtualization environment 200 of FIG. 2. In one or more embodiments, a user may not be able to access the virtual desktop associated with another user because only data associated with the exclusive communication between the user-end peripheral device $\mathbf{212}_1 \ldots \mathbf{212}_N$ and the VM $\mathbf{202}_1 \ldots \mathbf{202}_N$ may be available to the user. In the case of a traditional thin client based solution, a user may receive packet data associated with another user (i.e., another virtual desktop), which may provide for lesser security compared to the computer network virtualization environment 200.

Figure 6:
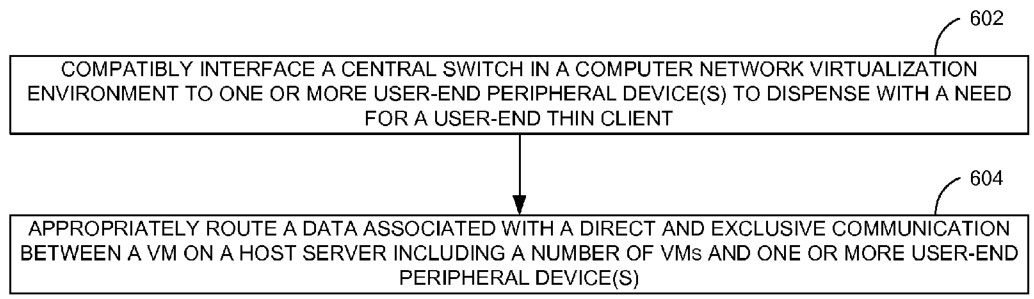
FIG. 6 is a process flow diagram detailing the operations involved in realizing a centralized computer network virtualization environment, according to one or more embodiments.

FIG. 6 shows a process flow diagram detailing the operations involved in realizing a centralized computer network virtualization environment 200, according to one or more embodiments. In one or more embodiments, operation 602 may involve compatibly interfacing a central switch 208 in the computer network virtualization environment 200 to one or more user-end peripheral device(s) $\mathbf{212}_1 \ldots \mathbf{212}_N$ to dispense with a need for a user-end thin client. In one or more embodiments, the central switch 208 may be compatibly interfaced with the one or more user-end peripheral devices(s) $212_1$ . . . $212_N$ through the converter interface 302 (e.g., RJ45 interface) and the user-end converters $210_1$ . . . $210_N$.

In one or more embodiments, operation 604 may involve appropriately routing a data associated with the direct and exclusive communication between a VM $202_1$ . . . $202_N$ on a host server 204 including a number of VMs $202_1$ . . . $202_N$ and the one or more user-end peripheral device(s) $212_1$ . . . $212_N$ using the central switch 208.

Figure 7:
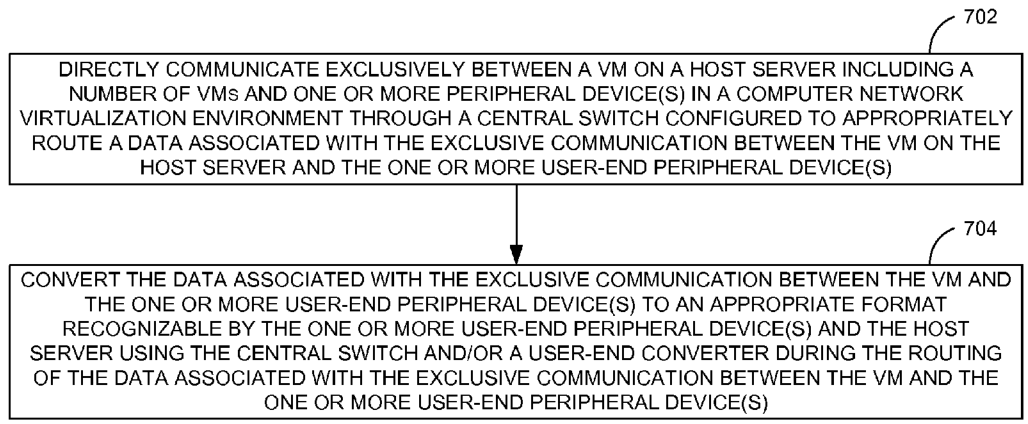
FIG. 7 is a process flow diagram detailing the operations involved in directly and exclusively communicating with an appropriate remote desktop from a user-end, according to one or more embodiments.

FIG. 7 shows a process flow diagram detailing the operations involved in directly and exclusively communicating with an appropriate remote desktop from a user-end, according to one or more embodiments. In one or more embodiments, operation 702 may involve directly communicating exclusively between a VM $202_1$ . . . $202_N$ on a host server 204 including a number of VMs $202_1$ . . . $202_N$ and one or more user-end peripheral device(s) $212_1$ . . . $212_N$ in a computer network virtualization environment 200 through a central switch 208. In one or more embodiments, the central switch 208 may be configured to appropriately route a data associated with the exclusive communication between the VM $202_1$ . . . $202_N$ on the host server 204 and the one or more user-end peripheral device(s) $212_1$ . . . $212_N$.

In one or more embodiments, operation 704 may involve converting the data associated with the exclusive communication between the VM $202_1$ . . . $202_N$ and the one or more user-end peripheral device(s) $212_1$ . . . $212_N$ to an appropriate format recognizable by the one or more user-end peripheral device(s) $212_1$ . . . $212_N$ and the host server 204 using the central switch 208 and/or a user-end converter $210_1$ . . . $210_N$ during the routing of the data associated with the exclusive communication between the VM $202_1$ . . . $202_N$ and the one or more user-end peripheral device(s) $210_1$ . . . $210_N$.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium).

In addition, it will be appreciated that the various operations, processes, and methods disclosed herein may be embodied in a machine-readable medium and/or a machine accessible medium compatible with a data processing system (e.g., a computer device), and may be performed in any order (e.g., including using means for achieving the various operations). Accordingly, the specification and drawings are to be regarded in an illustrative rather than a restrictive sense.

What is claimed is:

1. A method comprising:

compatibly interfacing a central switch in a computer network virtualization environment to a plurality of user-end peripheral devices associated with a single user; and receiving, at the central switch, packet data from a plurality of virtual machines on a host server intended for the plurality of user-end peripheral devices, wherein each of the plurality of virtual machines is associated with an exclusive communication with one of the plurality of user-end peripheral devices, and wherein the plurality of user-end peripheral devices comprise two or more of a computer display unit, a keyboard, a mouse, and a universal serial bus (USB) device;

separating the packet data from the plurality of virtual machines into a plurality of peripheral signals based on identification data associated with each of the plurality of virtual machines, wherein each peripheral signal includes packet data associated with the exclusive communication between one of the plurality of virtual machines and one of the plurality of user-end peripheral devices; and routing, using the central switch, each peripheral signal to an appropriate user-end peripheral device based on the appropriate user-end peripheral device being associated with the exclusive communication with one of the plurality of virtual machines.

2. The method of claim 1, further comprising converting, using a user-end converter, the packet data associated with the exclusive communication between one of the plurality of virtual machines and one of the plurality of user-end peripheral devices to an appropriate format recognizable by the one of the plurality of user-end peripheral devices.

3. The method of claim 1, wherein the central switch is a Keyboard, Video, Mouse (KVM) switch suitably adapted to the computer network virtualization environment.

4. The method of claim 1, further comprising coupling the central switch to a management network interface card (mNIC) of the host server, the management NIC being configured to assign identification information to the plurality of virtual machines on the host server.

5. The method of claim 1, wherein receiving, separating, and routing comprises:

transmitting the packet data from the host server including the plurality of virtual machines to the plurality of user-end peripheral devices, the transmission comprising:

transmitting the packet data associated with the plurality of virtual machines on the host server from the host server to the central switch;

separating a portion of the packet data from one of the plurality of virtual machines intended for one of the plurality of user-end peripheral devices at the central switch based on identification data associated with the one of the plurality of virtual machines;

combining the portion of the packet data associated with the communication between the one of the plurality of virtual machines and the one of the plurality of user-end peripheral devices at the central switch;

processing the combined portion of the packet data at the central switch to generate a peripheral signal to be input to a user-end converter; and converting the peripheral signal to a format compatible with the one of the plurality of user-end peripheral devices using the user-end converter, the method further comprising:

converting peripheral data from the one of the plurality of user-end peripheral devices to a peripheral signal using the user-end converter;

transmitting the peripheral signal from the user-end converter to the central switch;

converting the peripheral signal to packet data recognizable by the host server including the one of the plurality of virtual machines at the central switch;

attaching identification information associated with the one of the plurality of virtual machines to the packet data recognizable by the host server at the central switch;

combining the packet data including the identification information associated with the one of the plurality of virtual machines along with other packet data including corresponding virtual machine specific identification information thereof at the central switch; and transmitting the combined packet data to the host server including the one of the plurality of virtual machines.

6. The method of claim 2, further comprising at least one of:

coupling the central switch to at least one of the user-end converter and the host server through a Registered Jack (RJ) 45 interface; and wirelessly coupling the central switch to at least one of the user-end converter and the host server.

7. The method of claim 2, comprising providing one of a PS/2 CAT5dongle, PS/2 CAT6 dongle, Universal Serial Bus (USB) dongle, PS/2 dongle and a PS/2/USB cable as the user-end converter.

8. The method of claim 5, wherein transmitting the packet data from the host server including the one of the plurality of virtual machines to the one of the plurality of user-end peripheral devices includes:

transmitting Transmission Control Protocol/Internet Protocol (TCP/IP) packet data associated with the plurality of virtual machines on the host server from the host server to the central switch; and separating the TCP/IP packet data from the one of the plurality of virtual machines intended for the one of the plurality of one user-end peripheral devices at the central switch based on an associated port number in a TCP/IP stack, and wherein transmitting the data from the one of the plurality of user-end peripheral devices to the host server including the one of the plurality of virtual machines includes:

converting the peripheral signal to TCP/IP packet data recognizable by the host server including the one of the plurality of virtual machines at the central switch; and attaching a TCP/IP port number associated with the one of the plurality of virtual machines to the TCP/IP packet data recognizable by the host server at the central switch.

9. A method comprising:

receiving, at a central switch, packet data from a plurality of virtual machines on a host server intended for the plurality of user-end peripheral devices associated with a single user, wherein each of the plurality of virtual machines is associated with an exclusive communication with one of the plurality of user-end peripheral devices, and wherein the plurality of user-end peripheral devices comprise two or more of a computer display unit, a keyboard, a mouse, and a USB device;

separating the packet data from the plurality of virtual machines into a plurality of peripheral signals based on identification data associated with each of the plurality of virtual machines, wherein each peripheral signal includes packet data associated with the exclusive communication between one of the plurality of virtual machines and one of the plurality of user-end peripheral devices; and routing, using the central switch, each peripheral signal to an appropriate user-end peripheral device based on the appropriate user-end peripheral device being associated with the exclusive communication with one of the plurality of virtual machines, wherein routing comprises converting the plurality of peripheral signals to an appropriate format recognizable by each appropriate user-end peripheral device using a user-end converter during the routing of each peripheral signal associated with the exclusive communication between the one of the plurality of virtual machines and the appropriate user-end peripheral device.

10. The method of claim 9, wherein receiving, separating, and routing:

transmitting packet data associated with the plurality of virtual machines on the host server from the host server to the central switch;

separating a portion of the packet data from one of the plurality of virtual machines intended for one of the plurality of user-end peripheral devices at the central switch based on identification data associated with the one of the plurality of virtual machines;

combining the portion of the packet data associated with the communication between the one of the plurality of virtual machines and the one of the plurality of user-end peripheral devices at the central switch;

processing the combined portion of the packet data at the central switch to generate a peripheral signal to be input to the user-end converter; and converting the peripheral signal to a format compatible with the one of the plurality of user-end peripheral devices using a user-end converter the method further comprising:

converting a peripheral data from the one of the plurality of user-end peripheral devices to a peripheral signal using the user-end converter to the one of the plurality of virtual machines associated with the one of the plurality of user-end peripheral devices;

transmitting the peripheral signal from the user-end converter to the central switch;

converting the peripheral signal to packet data recognizable by the host server including the one of the plurality of virtual machines at the central switch;

attaching identification information associated with the one of the plurality of virtual machines to the packet data recognizable by the host server at the central switch;

combining the packet data including the identification information associated with the one of the plurality of virtual machines along with other packet data including corresponding virtual machine specific identification information thereof at the central switch; and transmitting the combined packet data to the host server including the one of the plurality of virtual machines.

11. The method of claim 9, wherein the central switch is a KVM switch suitably adapted to the computer network virtualization environment.

12. The method of claim 9, further comprising at least one of:

coupling the central switch to at least one of the user-end converter and the host server through an RJ45 interface; and wirelessly coupling the central switch to at least one of the user-end converter and the host server.

13. The method of claim 9, comprising providing one of a PS/2+video CAT5 dongle, PS/2+video CAT6 dongle, USB+video dongle, PS/2 dongle and a PS/2/USB+video cable as the user-end converter.

14. An apparatus comprising:

one or more computer processors; and a computer-readable storage medium comprising instructions for controlling the one or more computer processors to be operable to:

receive, at a central switch, packet data from a plurality of virtual machines on a host server intended for the plurality of user-end peripheral devices associated with a single user, wherein each of the plurality of virtual machines is associated with an exclusive communication with one of the plurality of user-end peripheral devices, and wherein the one of the plurality of user-end peripheral devices comprise two or more of a computer display unit, a keyboard, a mouse, and a USB device;

separate the packet data from the plurality of virtual machines into a plurality of peripheral signals based on identification data associated with each of the plurality of virtual machines, wherein each peripheral signal includes packet data associated with the exclusive communication between one of the plurality of virtual machines and one of the plurality of user-end peripheral devices; and route, using the central switch, each peripheral signal to an appropriate user-end peripheral device based on the appropriate user-end peripheral device being associated with the exclusive communication with one of the plurality of virtual machines.

15. The apparatus of claim 14, further comprising:

a host server interface configured to compatibly interface to a host server in a computer network virtualization environment, the host server comprising the plurality of virtual machines; and a converter interface configured to compatibly interface to a user-end converter associated with one of the plurality of user-end peripheral devices, wherein data associated with the exclusive communication between one of the plurality of virtual machines on the host server and an associated one of the plurality of user-end peripheral devices is configured to be appropriately routed to one of the host server and the one of the plurality of user-end peripheral devices through the host server interface and the converter interface.

16. The apparatus of claim 14, further operable to convert the data associated with the exclusive communication between the one of the plurality of user-end peripheral devices and the corresponding one of the plurality of virtual machines to an appropriate format recognizable by the one of the plurality of user-end peripheral devices and the host server.

17. The apparatus of claim 14, wherein the central switch is a KVM switch suitably adapted to a computer network virtualization environment.

* * * * *